United States Patent [19]

Suzuki et al.

[11] 4,428,342

[45] Jan. 31, 1984

[54] METHOD AND SYSTEM FOR OPERATING AN INTERNAL COMBUSTION ENGINE AT OPTIMUM TORQUE

[75] Inventors: Atsushi Suzuki; Norio Omori; Masakazu Ninomiya; Susumu Akiyama, all of Kariya; Yuji Hirabayashi, Aichi, all of Japan

[73] Assignee: Nippondenso Co., Ltd., Kariya, Japan

[21] Appl. No.: 314,022

[22] Filed: Oct. 22, 1981

[30] Foreign Application Priority Data

Oct. 22, 1980 [JP] Japan .................................. 55-148523

[51] Int. Cl.³ .............................................. F02P 5/08
[52] U.S. Cl. .................................... 123/419; 123/436; 364/158; 364/431.05
[58] Field of Search ................ 123/416, 417, 418, 419, 123/436, 480, 487; 364/431.04, 431.05, 148, 158, 159

[56] References Cited

U.S. PATENT DOCUMENTS

| | | | |
|---|---|---|---|
| 3,142,967 | 8/1964 | Schweitzer | 60/105 |
| 4,026,251 | 5/1977 | Schweitzer et al. | 123/419 |
| 4,130,863 | 12/1978 | Schweitzer et al. | 123/487 |
| 4,236,214 | 11/1980 | Sasayama | 364/431.04 |
| 4,306,284 | 12/1981 | Malcolm | 123/416 |
| 4,322,800 | 3/1982 | Hisegawa et al. | 123/417 |
| 4,379,333 | 4/1983 | Ninomiya et al. | 123/417 |

Primary Examiner—Andrew M. Dolinar
Attorney, Agent, or Firm—Cushman, Darby & Cushman

[57] ABSTRACT

Spark ignition timing of an internal combustion engine is oscillated on each side of a variable reference setting by varying it at stepwisely variable amounts during positive and negative swings and the resultant engine speed is detected in at least three successive phases. The detected engine speed values are compared one against each other to determine whether they satisfy one of two specified conditions. The variable reference is adjusted in a direction toward an optimum position depending on which one of the conditions is satisfied.

7 Claims, 7 Drawing Figures

METHOD AND SYSTEM FOR OPERATING AN INTERNAL COMBUSTION ENGINE AT OPTIMUM TORQUE

BACKGROUND OF THE INVENTION

The present invention relates to a method and system for operating an internal combustion engine at maximum output torque under varying operating conditions by oscillating the setting of ignition timing on each side of a variable reference setting.

Spark ignition timing is usually controlled in response to engine variables such as crankshaft speed and intake vacuum so that the engine output torque is at maximum while fuel consumption rate is a minimum in so far as it causes no problem with respect to knocking and exhaust gas emission. However, due to difficulties inherent in calibrating engines to their particular operating characteristics during manufacture, ignition advance setting is not necessarily adjusted to the optimum value of each engine. Even if such calibration is achieved, the operating characteristics of the engine tend to vary as a function of environmental factors and aging, the particular ignition setting would cease to be the optium setting.

A spark ignition control system, shown and described in U.S. Pat. No. 3,142,967 granted to Paul H. Schweitzer, discloses means for dithering or oscillating the ignition setting on either side of a variable reference setting to detect the resultant variation in engine output variable such as engine speed at two consecutive points in time. The reference advance timing is corrected in one way or another in response to the result of comparison between the detected output engine variables. If the engine speed variation resulting from an ignition dithered in the advance direction is greater than that resulting from a subsequent ignition dithered in the retard direction, the reference setting is advanced by a predetermined amount, and if the situation is reversed the reference setting is retarded. The process is repeated so that ignition timing is maintained at an optimum position at which the engine delivers maximum output power. Since the corrective indications are derived from two successive engine output variables, the prior art system has an inherent difficulty in distinguishing between the variations caused by dither actions and those caused by manual acceleration or deceleration.

U.S. Pat. No. 4,379,333, assigned to the same assignee as the present invention, discloses an improved ignition control system in which the variation of engine output variable is detected at three successive points and compared one against each other to determine one of two specified conditions which occur exclusively when the ignition setting is dithered. Since the ignition setting is dithered on each side of a variable reference setting during each oscillation, there is occasioned a large amount of engine speed variation with a resultant poor drivability.

SUMMARY OF THE INVENTION

The primary object of the present invention is therefore to eliminate the poor drivability problem by oscillating the ignition setting by varying it at stepwisely variable amounts between a reference setting and a predetermined value.

The invention provides an improved method of operating an internal combustion engine at maximum output torque under varying operating conditions. The method comprises oscillating the setting of the input engine variable on each side of a variable reference setting by varying the setting of an adjustable input engine variable at stepwisely variable amounts during positive and negative swings, sensing an output engine variable representative of the output torque during at least three successive phases of the oscillation, detecting a first or a second relationship in each of which the output variables sensed in the three phases of the oscillation are arranged in a specified order of magnitude, and adjusting the variable reference setting toward an optimum position in response to the detected first or second relationship.

Preferably, the setting of the input variable is maintained when the varied setting reaches a predetermined value for a period during which a predetermined number of ignitions are allowed to occur. A clock count is measured during this period and stored in a memory associated with each of the successive phases of the oscillation for making comparison between to detect correspondence with the specified conditions.

BRIEF DESCRIPTION OF THE DRAWINGS

The invention will be described in further detail with reference to the accompanying drawings wherein.

DETAILED DESCRIPTION

Figure 1:
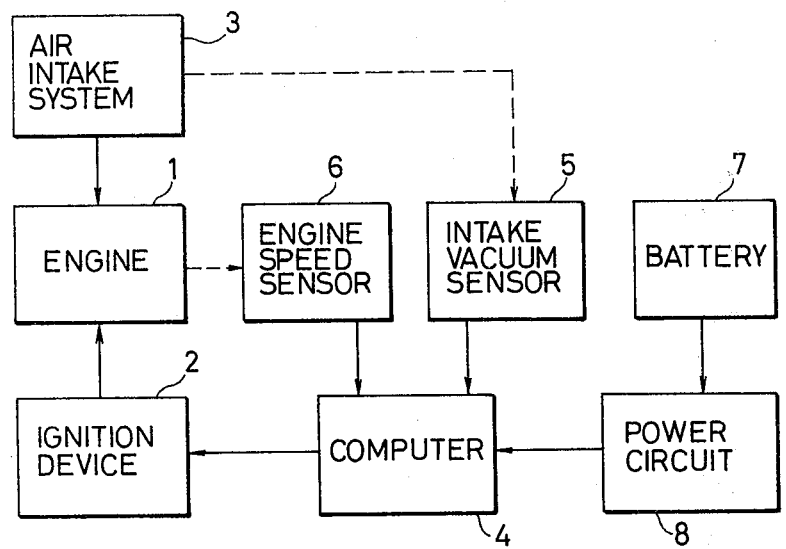
FIG. 1 is a block diagram of an embodiment of the ignition control system.

Referring now to FIG. 1, there is shown an embodiment of the ignition control system of the present invention. The ignition control system includes a microprocessor-based control unit or computer 4 of a known hardware structure which receives engine torque indicating signals from an intake vaccum sensor 5 which senses the vacuum in the air intake system 3 of an internal combustion engine 1 and from an engine speed sensor 6 which senses the speed or r.p.m. of the engine 1. The computer 4, powered by a vehicle-mounted battery 7 via a voltage-stabilized power circuit 8, is preprogrammed according to the invention as will be described hereinbelow. Microcomputer 4 operates on these input signals to derive an ignition control signal for application to an ignition device 2 of the well known construction which develops a high tension voltage in the secondary winding of a transformer in response to the turn-off of a primary current and distributes it to the ignition plugs of the engine cylinders.

Figure 3A:
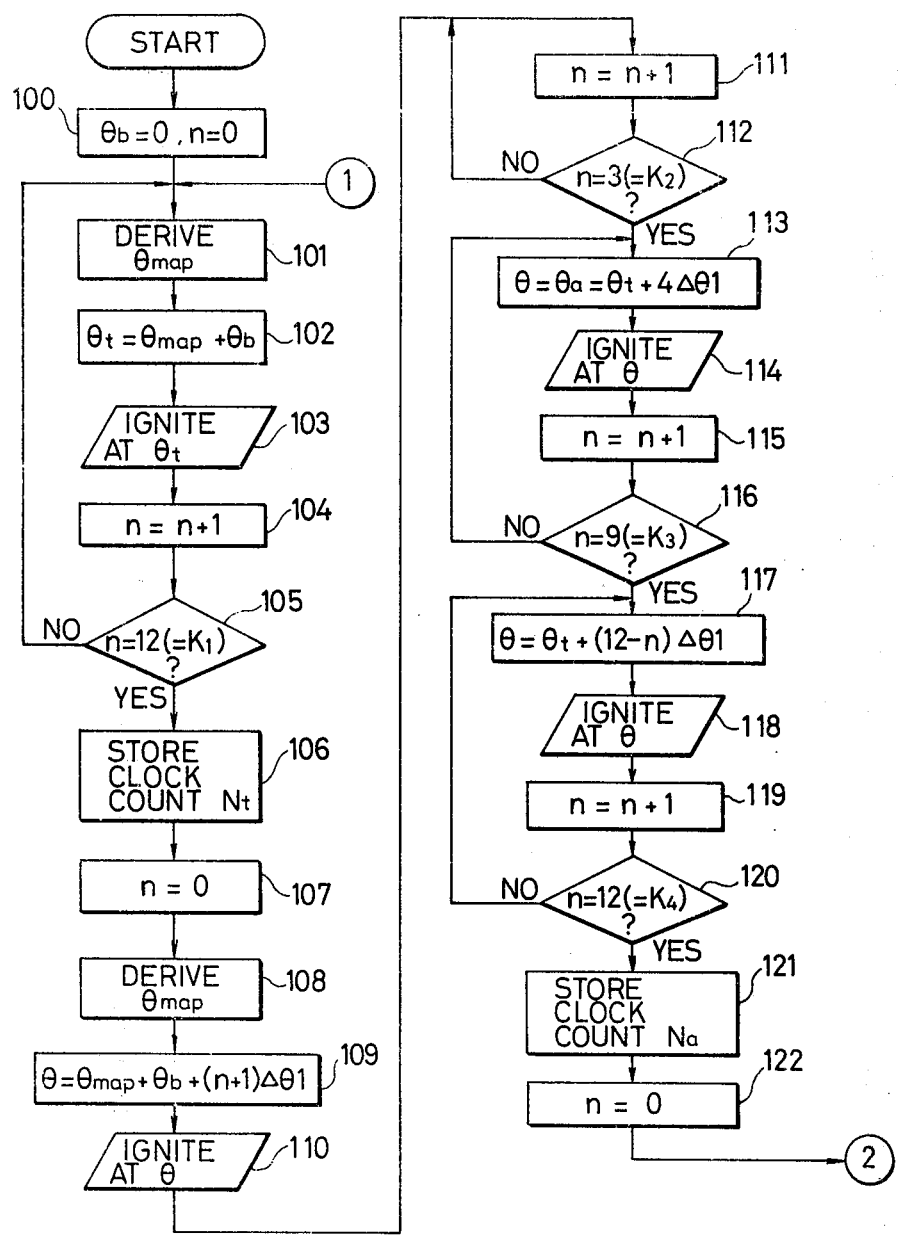
FIGS. 3A and 3B are flow diagrams associated with the microcomputer of FIG. 1.
Figure 3B:
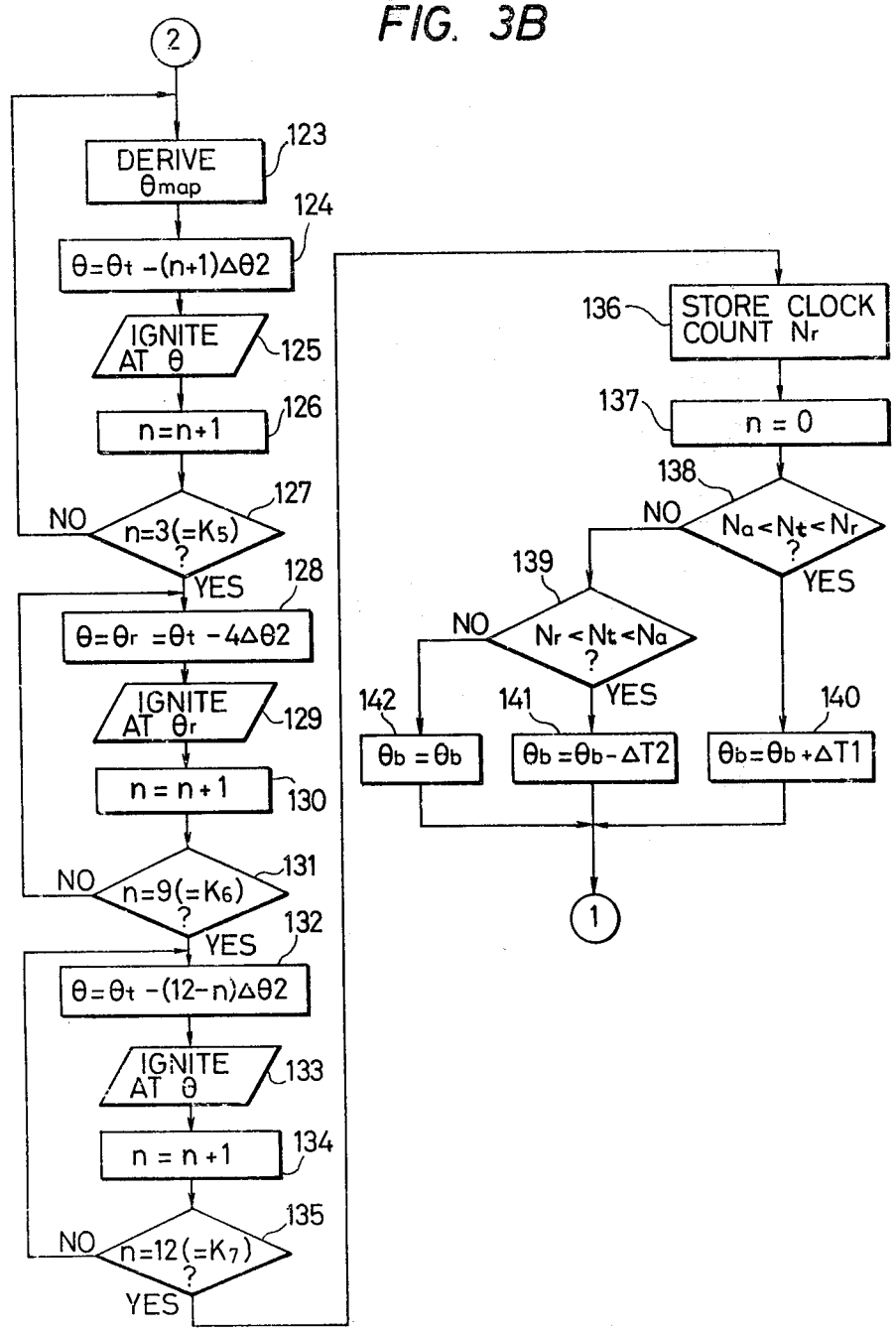
Figure 4:
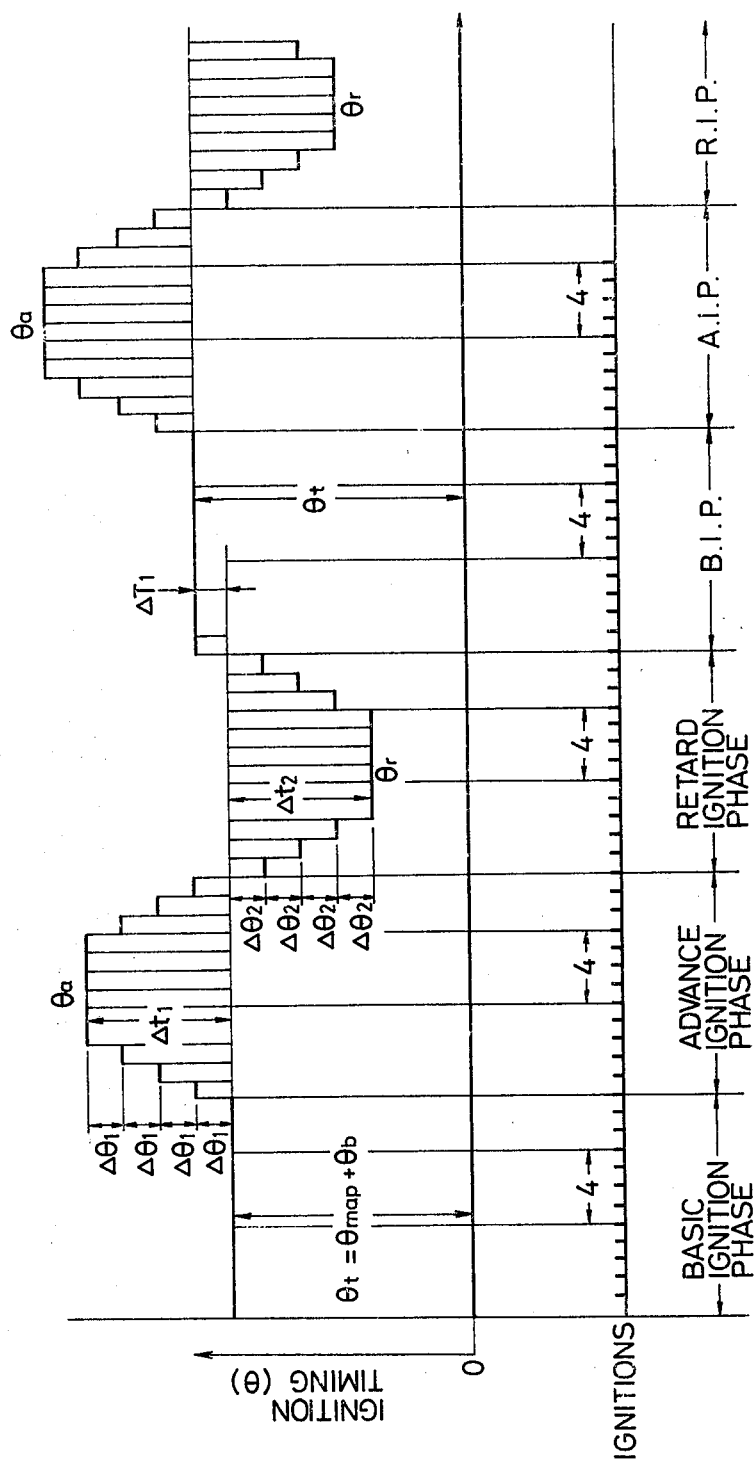
FIG. 4 a timing diagram useful for describing the operation of the invention.

Referring to FIGS. 3A, 3B and 4 in which flow diagrams of the program of microcomputer 4 and the various ignition phases of the control system of the invention are illustrated. According to the invention, the ignition timing is controlled in a recyclic series of three successive ignition phases, basic or target timing, advance timing and retard timing. In the advance and retard phases ignition timing is dithered on the advance and retard sides of the target timing, as illustrated in FIG. 4.

When internal combustion engine 1 starts operating, the program starts at initializing step 100 by setting ignition's basic correction angle $\theta b$ and a count value "n" to zero. At step 101 microcomputer 4 reads off the sensed engine operating parameters from the sensors 5 and 6 and retrieves a basic ignition advance angle $\theta$map from a memory in which a set of such data is stored in locations associated with the sensed vacuum and engine speed and proceeds to a step 102 to derive a reference or target ignition angle $\theta t = \theta map + \theta b$ advanced with respect to the top dead center (TDC), which is expressed in terms of "before top dead center (BTDC)." At step 103 microcomputer 4 generates an ignition control signal and issues an instruction to the ignition device 2 to cause ignition to occur at the target ignition angle $\theta t$. At step 104 the count value "n" is incremented by "1" and subsequently at step 105 "n=12 (=k1)" is checked to branch out to the step 101 to repeatedly execute the steps 101 to 104 until "n=12" is reached. Thus, ignition repeatedly occurs twelve (12) times at the advance angle $\theta t$ during a basic ignition phase (see FIG. 4) before microcomputer 4 goes to a step 106. At step 106 a clock count Nt, which was counted for a period of four (4) ignitions of the basic ignition phase, is placed in storage as a reference or target indicator of engine speed or torque. The clock count is subsequently reset to zero at step 107.

The basic ignition phase is immediately followed by an advance dither ignition phase. Advance dither ignition phase essentially comprises three successive stages. During the first advance stage ignition timing is increased stepwise in a direction away from, and on the advance side of, the reference setting, or target angle. During the second advance stage ignitions occur at a constant angle, and during the third or last stage ignition timing is decreased stepwise in a direction toward the target angle. The first advance ignition stage commences at step 108 to retrieve a basic ignition angle $\theta$map in a manner similar to the step 101. At step 109, a target advance angle $\theta t$ is derived by summing $\theta$map with the basic correction angle $\theta b$, and $\theta t$ is summed with a positive increasing value "$(n+1)\Delta\theta 1$" where $\Delta\theta 1$ equals one-fourth of $\Delta t1$ (FIG. 4) which is the maximum of the advance dither. At step 110 ignition occurs at the advanced angle $\theta$. Count value "n" is incremented by one at step 111. The steps 108 to 111 are repeated until "n=3(=k2)" is detected at step 112 so that the ignition occurs at successively advanced angles with respect to the target angle $\theta t$ until the total of the dithered angle on the advance side of the target angle $\theta t$ becomes equal to $3\Delta\theta 1$, terminating the first ignition stage. The second advance ignition stage begins at step 113 in which the target advance angle $\theta t$ is derived in the same manner as in step 102 and is summed with a constant value $\Delta t1 (=4\Delta\theta 1)$ so that ignition is advanced to a maximum angle $\theta a$ during each advance phase. At step 114 ignition is caused to take place at $\theta = \theta a$ and subsequently the count value "n" is incremented by one at step 115. The steps 113 to 115 are repeatedly executed so that six ignitions occur at advance angle $\theta a$ until "n=9(=k3)" is detected at step 116 whereupon the second advance ignition stage terminates.

The third advance ignition stage commenses at step 117 in which the advance angle $\theta$ is determined by summing the target angle $\theta t$ with an increment of a decreasing value $(12-n)\Delta\theta 1$. At step 118 ignition is provided at $\theta$ determined by the step 117 and count value "n" is incremented by one at step 119 and the process is repeated so that the advance angle $\theta$ is varied at decrements of $\Delta\theta 1$ in three successive ignitions until "n=12(=k4)" is reached, which is detected in a step 120. The advance ignition phase is terminated by storing in a memory a clock count Na which has been counted for a period of four successive ignitions during the second ignition stage. This stored value is used as an engine torque indicator of the advance ignition phase. The count "n" is then reset to zero at step 122.

The retard dither ignition phase comprises three successive ignition stages in a similar manner to those of the advance ignition phase except that the direction of dither is opposite thereto. In the first retard ignition stage, ignition timing is varied stepwise in a direction away from the target angle, during the second retard ignition stage ignition timing is provided at a constant retard angle, and during the third stage ignition timing is varied stepwise in a direction toward the target angle.

The retard phase begins at step 123, FIG. 3B, in which the basic advance angle $\theta$map is retrieved from the memory in response to the instantaneous values of the sensed intake vacuum and engine speed as it is derived at the beginning of each of the basic and advance ignition phases. At step 124, the advance angle $\theta$ is varied by summing the target angle $\theta t$ with an increasing negative value $-(n+1)\Delta\theta 2$ where $\Delta\theta 2$ equals one-fourth of a maximum angle $\theta r$ dithered on the retard side of the target angle $\theta t$. Steps 125 and 126 follow successively to cause ignitions to occur at $\theta$ and increment count "n" by one. Step 127 checks to see if "n=3(=k5)" is reached in the count to repeat the steps 123 to 126 three times so that ignition timing is varied in three successive intervals on the retard side of, and in a direction away from, the target angle $\theta t$. Step 128 initiates the second retard ignition stage by setting the advance angle $\theta$ to a constant value $\theta r (=\theta t - 4\Delta\theta 2)$ at which ignition is provided in a subsequent step 129 which is followed by a count increment at step 130. Subsequently at step 131, "n=9(=k6)?" is executed to repeat the steps 128 to 130 to cause six ignitions to occur at $\theta r$. The third retard ignition stage begins at step 132 where the advance angle $\theta$ is updated by summing the target angle $\theta t$ with a decreasing negative value $-(12-n)\Delta\theta 2$. Steps 133, 134 and 135 then follow to cause three ignitions to occur at the advance angle which is stepwise varied on the retard side of, and in a direction toward, the target angle $\theta t$.

At step 136 a clock count Nr, which has been counted during the four ignitions of the second retard ignition stage, is stored in a memory as an engine torque indicator of the retard ignition phase. Count "n" is reset to zero at step 137.

Microcomputer 4 now advances to steps 138 and 139 to check the stored counts Nt, Na and Nr one against each other to determine which one of the following relationships "a" and "b" is satisfied:

$$Na < Nt < Nr \quad (a)$$

$$Nr < Nt < Na \quad (b)$$

Figure 2:
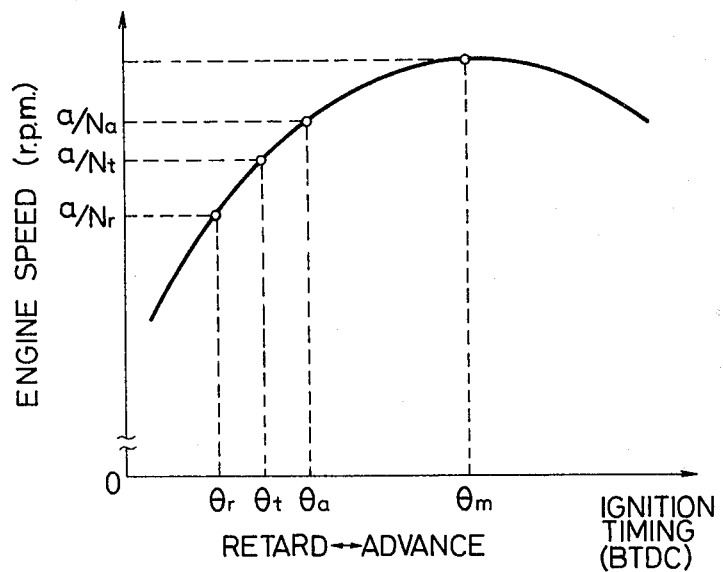
FIG. 2 is a plot of engine speed as a function of ignition setting or angle.

Assume that the target angle $\theta t$ is on the retard side of the optimum angle $\theta m$ at which the engine output torque is at maximum as shown in FIG. 2 provided that there is no variation in engine input variables (acceleration or deceleration) ignitions at timings $\theta r$ and $\theta a$ dithered on both sides of this target timing $\theta t$ will establish an engine speed relationship $a/Nr < a/Nt < a/Na$ where is "a" constant, and hence $Na < Nt < Nr$. If the engine is operating on the advance side of the optimum timing $\theta m$ provided that there is no variation in the engine input variables except for ignition timing at this particular instant, an engine speed relationship $a/Nr > a/Nt > a/Na$ will result and hence $Nr < Nt < Na$.

Therefore, if the relationship (a) is established, microcomputer 4 recognizes it at step 138 as a condition that ignition timing is retarded with respect to the optimum point and a step 140 is executed to increment the basic correction angle $\theta b$ by $\Delta T1$. If the relationship (b) is established, microcomputer 4 recognizes it at step 139 as a condition that ignition timing is advanced with respect to the optimum point and a step 141 is executed to decrement the basic correction angle $\theta b$ by $\Delta T2$. If relations other than (a) and (b) are established, the microcomputer then recognizes them as conditions in which ignition occurs at the optimum timing or there is a change in the engine input variables and a step 142 is executed to make no amendment to the basic correction data $\theta b$. For example, if the engine is accelerated the engine speed will increase as a function of time and as a result the engine speed values as represented by the counts establish a relationship $a/Nt < a/Na < a/Nr$ and hence there is established a relationship $Nr < Na < Nt$ which does not meet any of the specified relationships. It will be seen that a similar situation occurs when the engine is decelerated.

The program thus terminates at steps 140, 141 or 142 and returns to the step 101 to repeat the foregoing process so that ignition timing is automatically shifted toward the optimum point $\theta m$ and once the latter is reached ignition timing is maintained at the optimum point.

Figure 5:
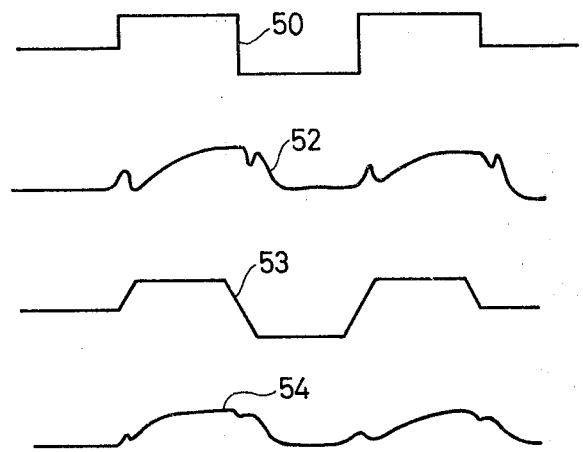
FIG. 5 is a waveform diagram useful for understanding the benefit of the invention.

FIG. 5 is an illustration of waveforms for making comparison between the aforesaid U.S. Pat. No. 4,379,333 and the present invention. The rectangular waveform 50 represents the dithered ignition timing of the '333 patent. Due to the rapid dithering of ignition timing, the prior art system results in a rapidly varying engine speed as indicated by a waveform 52. On the other hand, the waveform 53 indicates the gradual dithering of ignition timing according to the invention. As indicated by a engine speed waveform 54, the present invention substantially eliminates rapid engine speed variations which are considered undesirable for safe operation of the engine.

In a practical embodiment of the invention, the dither angles $\Delta t1$ and $\Delta t2$ and the correction angles $\Delta T1$ and $\Delta T2$ are determined by taking into account the engine's stability performance and the frequency of the clock pulse used to provide the counts Na, Nt and Nr.

In an alternative embodiment of the invention, a set of correction angle data $\theta b$ is stored in a memory in a manner identical to the basic timing data $\theta$map and the stored data is retrieved in response to the sensed engine operating parameters, or output variables, so that the retrieved data may reflect a rapid acclerating or decelerating condition in order to instantly shift the target timing $\theta t$ to an optimum timing $\theta m$ which may vary as a result of the rapidly varying engine input variable. In a further alternative embodiment the basic and correction angle data are combined so that the target timing data may be derived from a single set of timing correction data $\theta b$.

Figure 6:
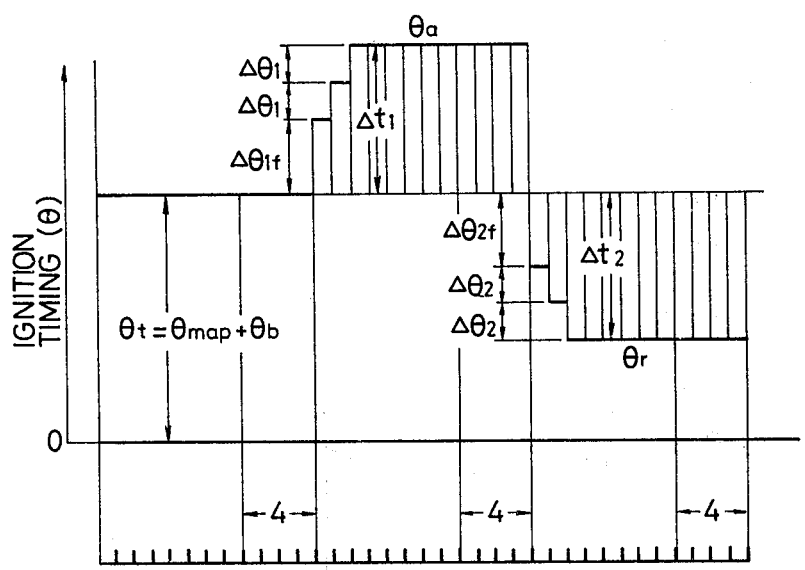
FIG. 6 is a timing diagram of a modified embodiment of the invention.

In a modified embodiment of the present invention, shown in FIG. 6, the dither angles $\Delta t1$ and $\Delta t2$ are not divided by equal increments or decrements. The first increment which occurs at the transition from the basic or target ignition phase to the advance dither phase has a value $\Delta \theta 1f$ which is greater than $\Delta \theta 1$ and likewise the first decrement that occurs at the transition from the advance dither phase to the next has a value $\Delta \theta 2f$ which is also greater than $\Delta \theta 2$.

The number of incremental steps on the advance side and the number of decremental steps on the retard side that occur within a given interval can be appropriately determined to best meet the engine performance.

The present invention could also be modified by causing ignitions to occur in a different order from that described above. For example, there occurs first a target ignition phase followed by an advance dither phase which is followed by a target ignition phase. The retard dither phase occurs following the second target ignition phase and is followed by a third target ignition phase, providing a total of five ignition phases in a recyclic sequence. In this instance, the stored counts Nt, Na, Nt, Nr and Nt are checked one against each other to determine on which side the ignition timing is effected.

What is claimed is:

1. The method of operating an internal combustion engine at optimum output torque under varying operating conditions, said engine having an adjustable input engine variable the setting of which controls the output torque, the method comprising:

oscillating the setting of the input engine variable on each side of a variable reference setting by varying the setting of the input variable by a successively changing fraction of the amplitude of the oscillation so that the oscillation assumes an incremental and decremental staircase value on each side of said variable reference setting;

sensing an output variable representative of said output torque during at least three successive phases of the oscillation;

detecting whether the sensed output variable establishes one of first and second sequential relationships of a plurality of possible sequential relationships indicating that said variable reference setting is on one of first and second sides of an optimum position; and adjusting said variable reference setting toward said optimum position in response to one of said detected first and second sequential relationships.

2. The method of claim 1, wherein said input engine variable is representative of spark ignition timing with respect to the top dead center of a cylinder of said engine.

3. The method of claim 2, wherein the step of oscillating comprises maintaining the setting of said input engine variable when said staircase value reaches a predetermined value for a period during which a predetermined number of ignitions occurs, and wherein the step of sensing said output variable comprises measuring said period as an indication of said output variable.

4. A control system for operating an internal combustion engine at optimum output torque under varying operating conditions, said engine having an adjustable input engine variable means the setting of which controls the output torque, comprising:

control means for oscillating the setting of said input variable means on each side of a variable reference setting by varying said input variable means by a successively changing fraction of the amplitude of the oscillation so that the oscillation assumes an incremental and decremental staircase value on each side of said variable reference setting;

means for sensing an output engine variable representative of said output torque during at least three successive phases of the oscillation;

means for detecting whether the sensed output variables establish one of first and second sequential relationships of a plurality of possible sequential relationships indicating that said variable reference setting is on one of first and second sides of an optimum position; and means for adjusting said variable reference setting toward an optimum position in response to one of said detected first and second relationships.

5. A control system as claimed in claim 4, wherein said engine input variable means comprises an engine ignition device.

6. A control system as claimed in claim 5, wherein said control means is arranged to maintain the setting of the input variable means when said staircase value reaches a predetermined value for a period during which a predetermined number of ignitions occurs, and is arranged to measure said period as an indication of said output variable.

7. A method of operating an internal combustion engine at optimum output torque under varying operating conditions, said engine having a spark ignition device which controls the output torque, comprising:

(a) constantly sensing an engine output variable representative of said output torque;

(b) generating a reference ignition angle value corresponding to the sensed engine output variable;

(c) causing said ignition device to generate ignitions in a first of three successive phases in response to said reference ignition angle value;

(d) sampling and holding the engine output variable sensed in said first phase;

(e) incrementing the reference ignition angle value to generate an advance ignition dither value;

(f) causing said ignition device to generate an ignition in response to said advance ignition dither value;

(g) repeating the steps (e) and (f) until said advance ignition dither value reaches a first predetermined value;

(h) causing said ignition device to generate ignitions in a second of the three successive phases in response to said first predetermined value;

(i) decrementing said advance ignition dither value;

(j) causing said ignition device to generate an ignition in response to the decremented advance ignition dither value;

(k) repeating the steps (i) and (j) until said advance ignition dither value reaches said reference ignition angle value derived in the step (b);

(l) sampling and holding the engine output variable sensed in said second phase;

(m) decrementing the reference ignition angle value to generate a retard ignition dither value;

(n) causing said ignition device to generate an ignition in response to said retard ignition dither value;

(o) repeating the steps (m) and (n) until said retard ignition dither value reaches a second predetermined value;

(p) causing said ignition device to generate ignitions in a third of the three successive phases in response to said second predetermined value;

(q) incrementing said retard ignition dither value toward said reference ignition angle value;

(r) causing said ignition device to generate an ignition in response to the incremented retard ignition dither value;

(s) repeating the steps (q) and (r) until each retard ignition dither value reaches said reference ignition angle value derived in the step (b);

(t) sampling and holding the engine output variable sensed in said third phase;

(u) comparing the engine output variables sampled in the steps (d), (l) and (t) against each other to determine whether said sampled variables establish one of first and second sequential relationships of a plurality of possible sequential relationships indicating that said reference ignition angle value is greater or smaller than an optimum value; and (v) varying said reference ignition angle value derived in the step (b) toward said optimum value in response to one of said first and second sequential relationships.

* * * * *